April 27, 1926.
F. G. FOLBERTH ET AL
FUEL FEEDING SYSTEM
Filed May 1, 1922    10 Sheets-Sheet 2
1,582,212
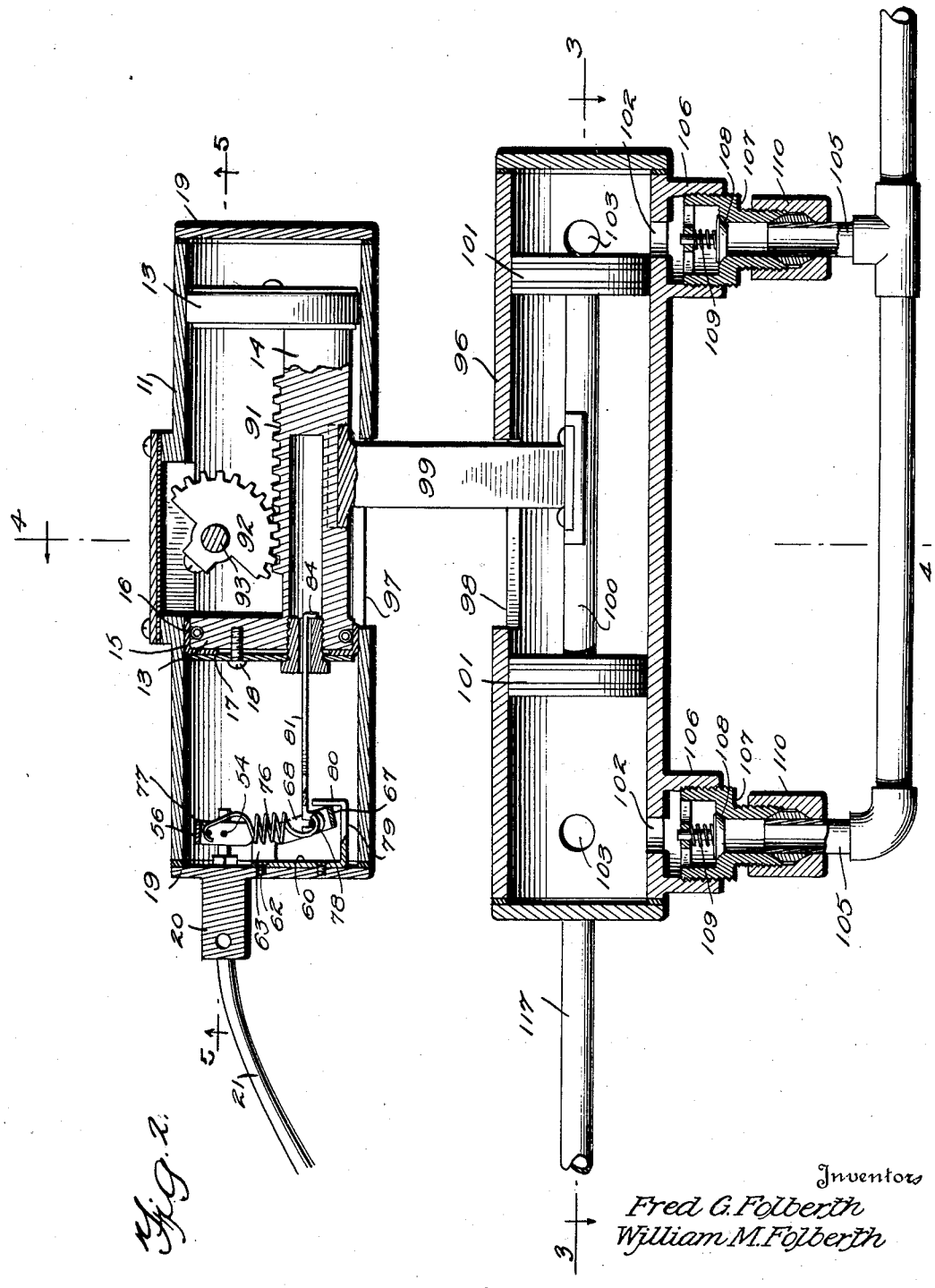
Inventors
Fred G. Folberth
William M. Folberth
By    Attorney

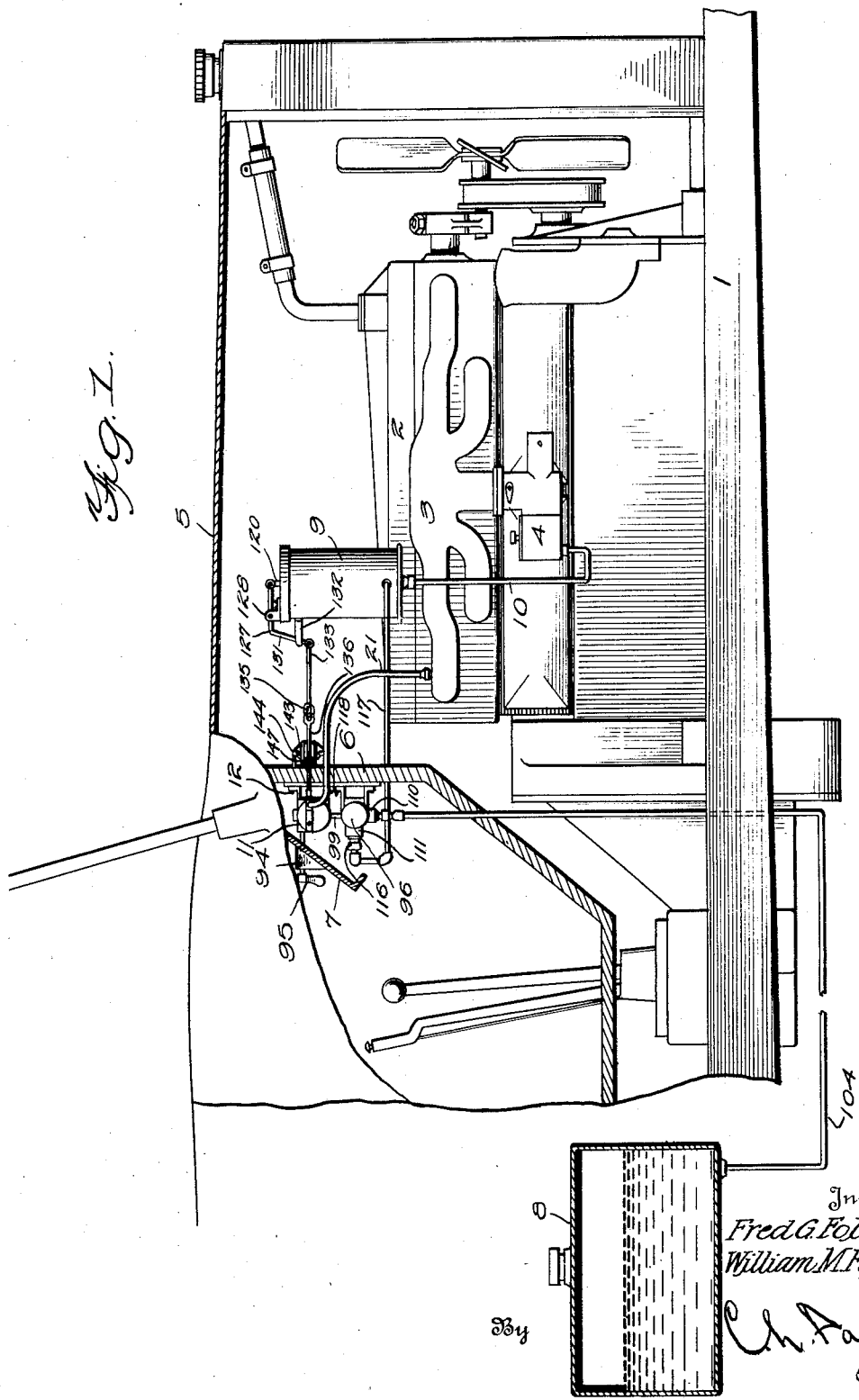

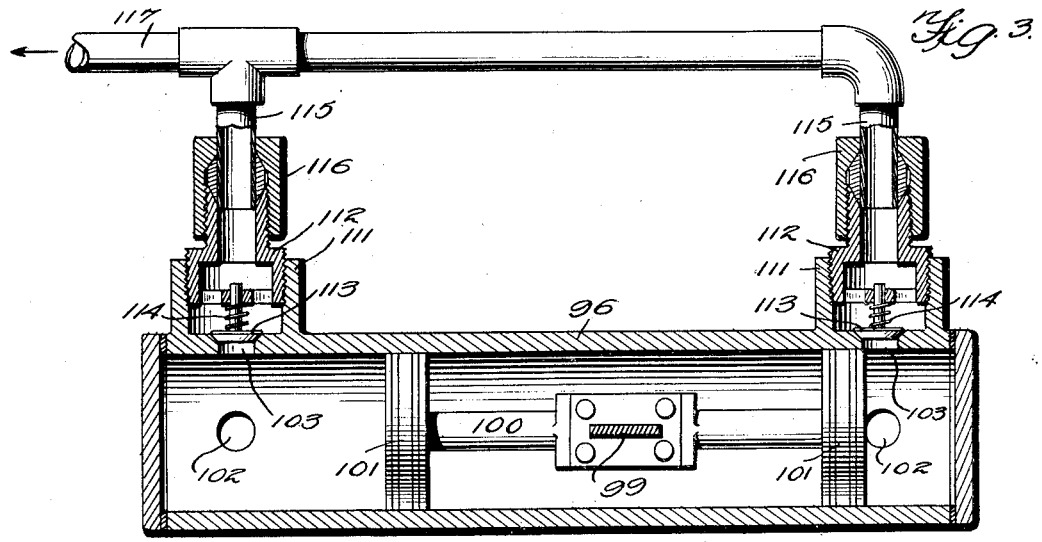
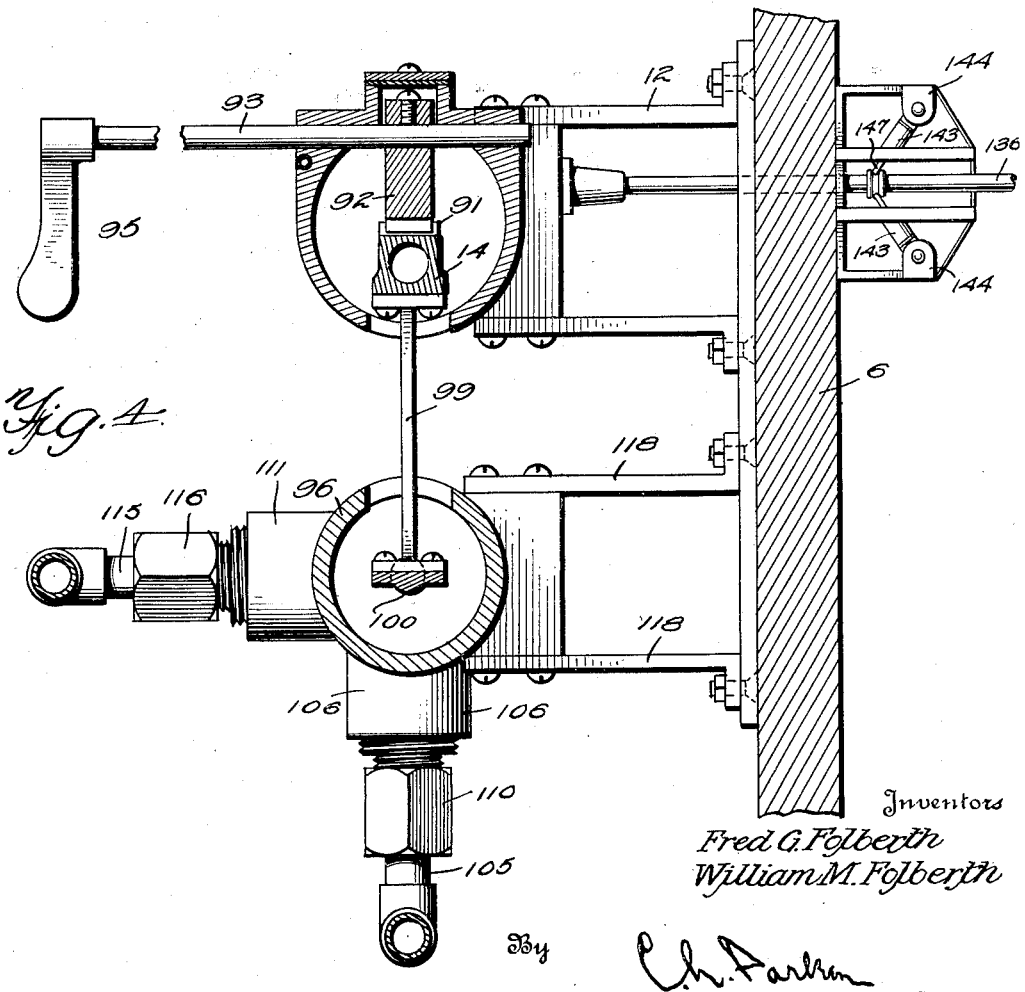

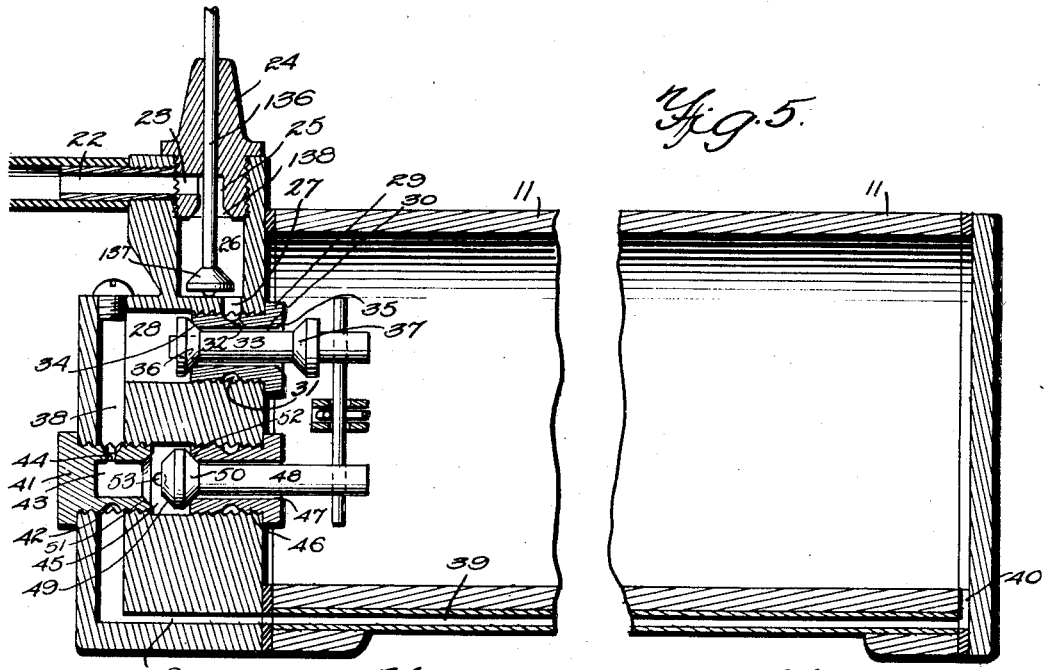
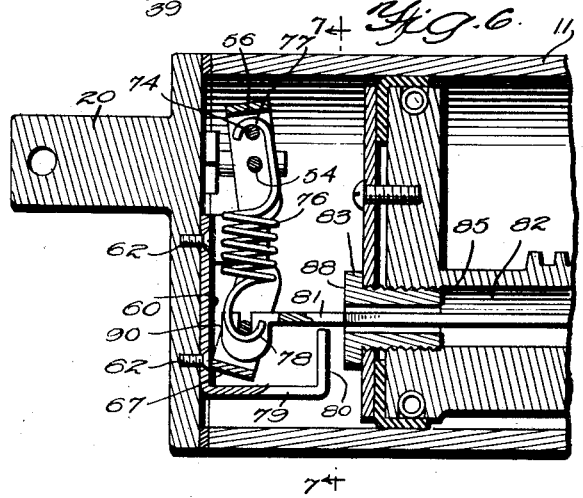
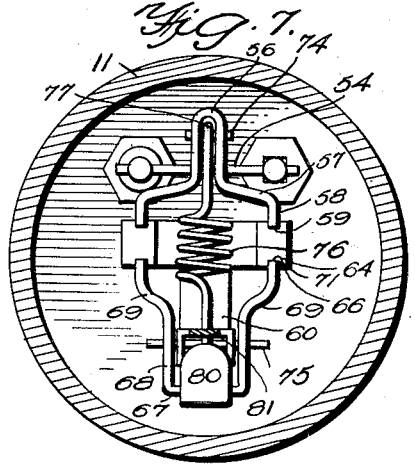
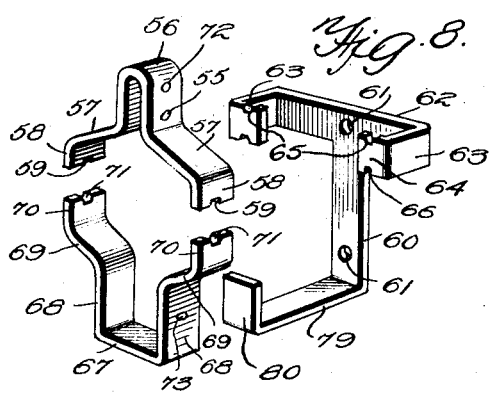
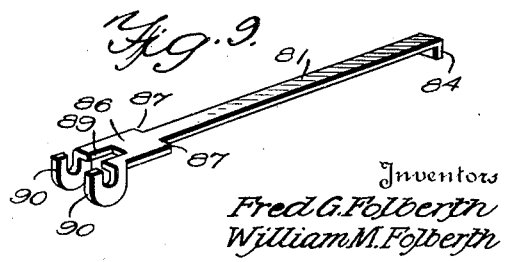

April 27, 1926. 1,582,212
F. G. FOLBERTH ET AL
FUEL FEEDING SYSTEM
Filed May 1, 1922   10 Sheets-Sheet 5
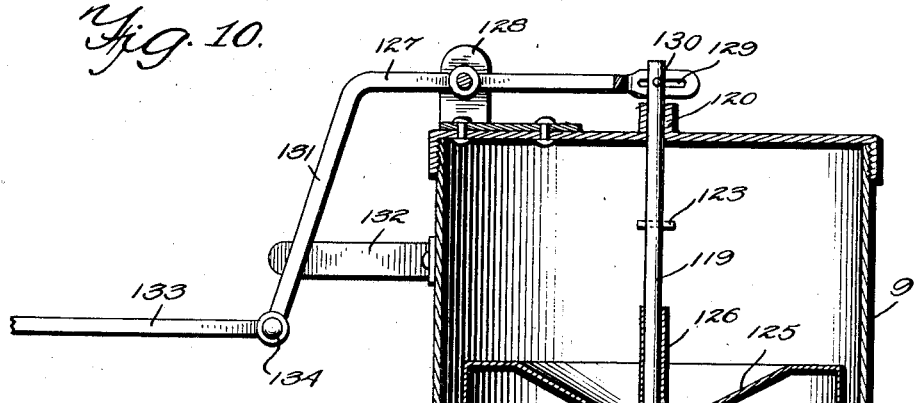
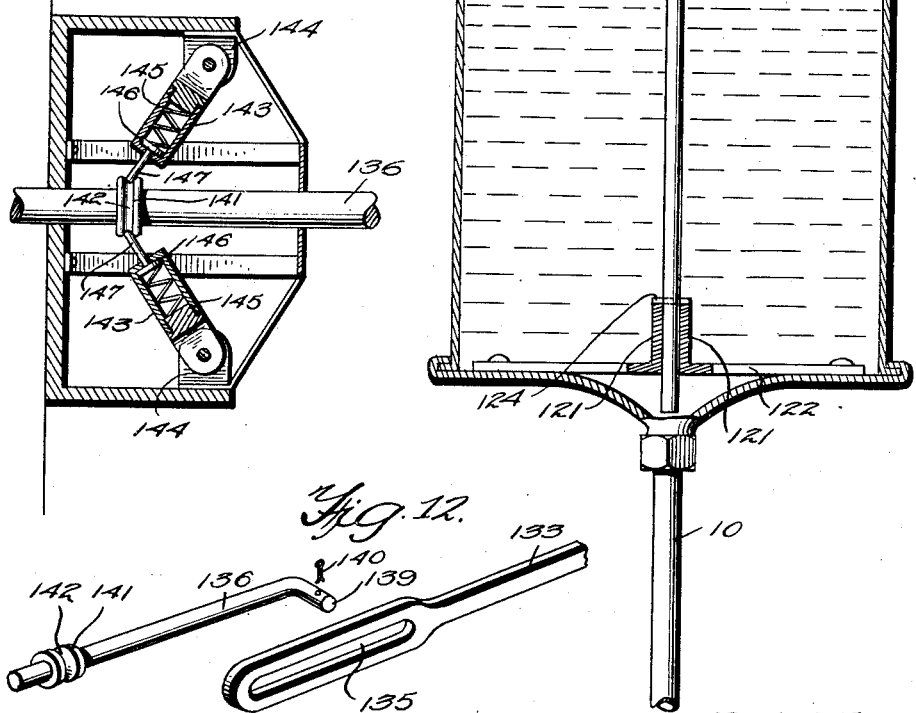
Inventors
Fred G. Folberth
William M. Folberth
By
Attorney April 27, 1926.
F. G. FOLBERTH ET AL
FUEL FEEDING SYSTEM
Filed May 1, 1922      10 Sheets-Sheet 6
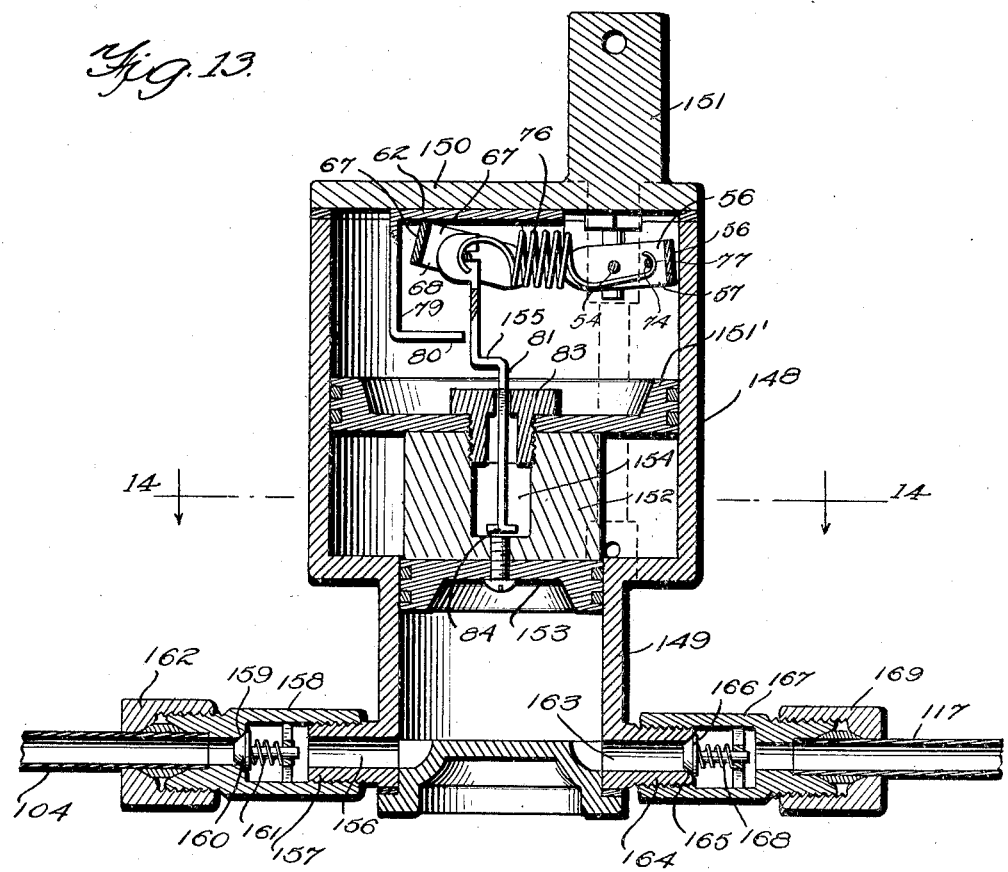
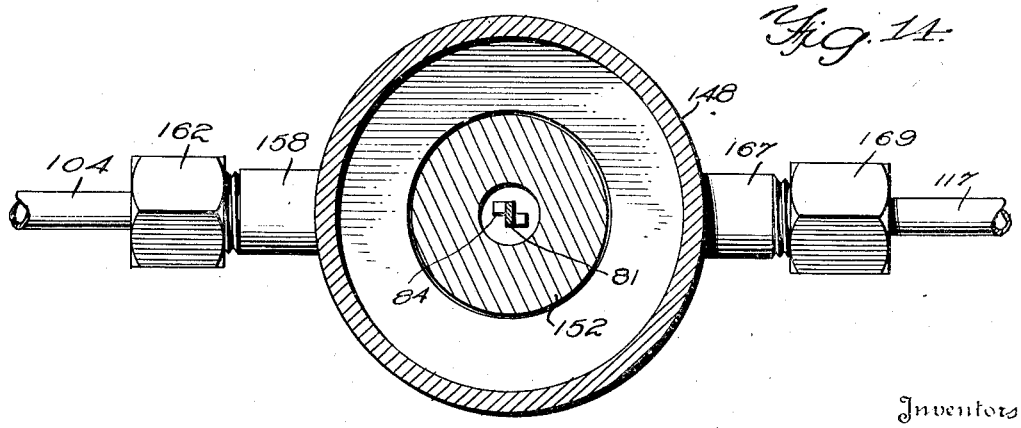
Inventors
Fred G. Folberth
William M. Folberth
By
Ch. Darken
Attorney

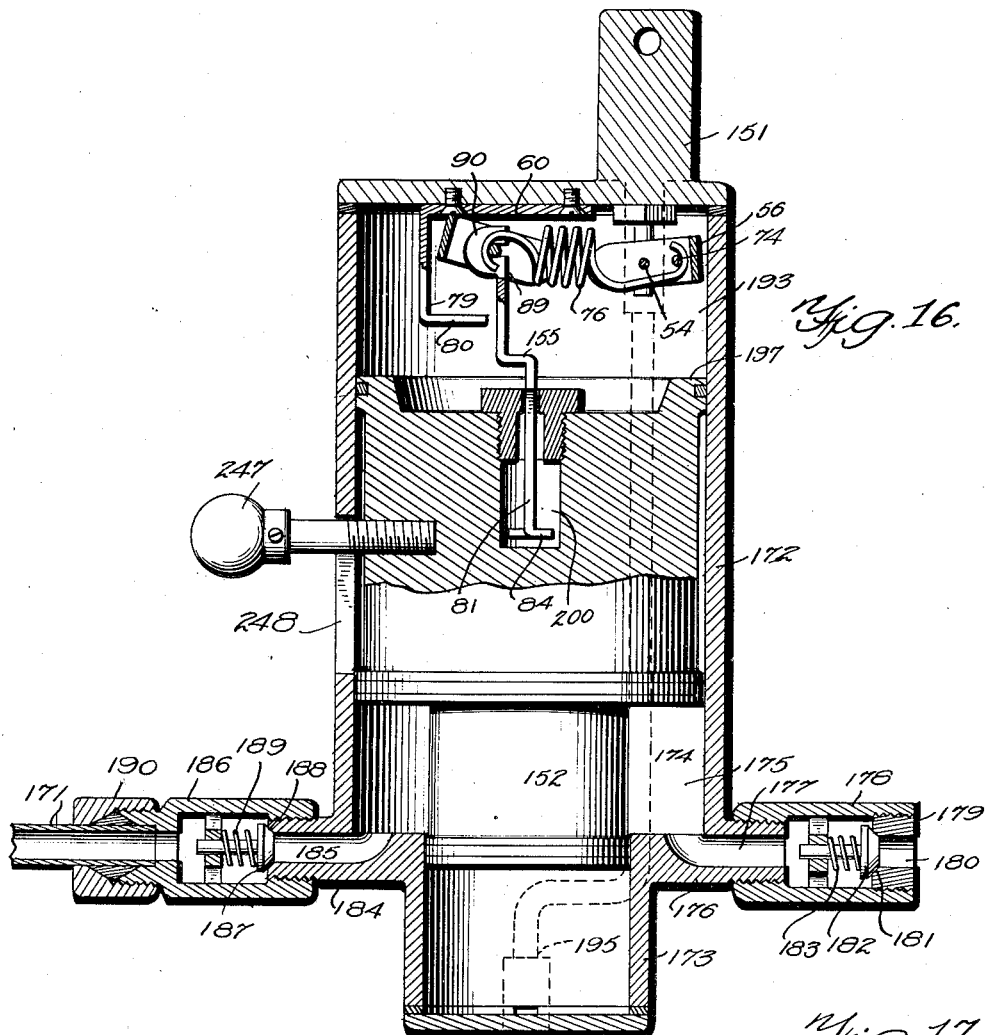
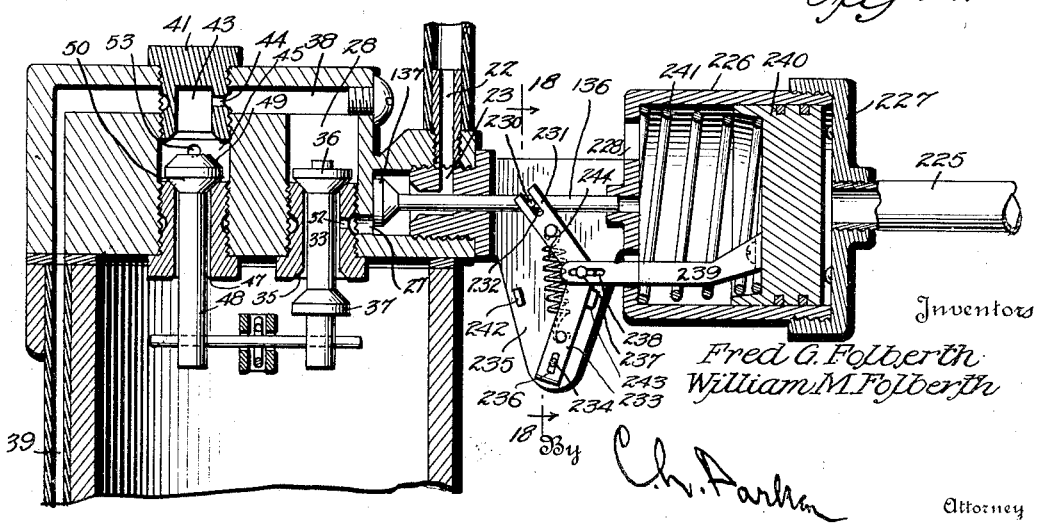

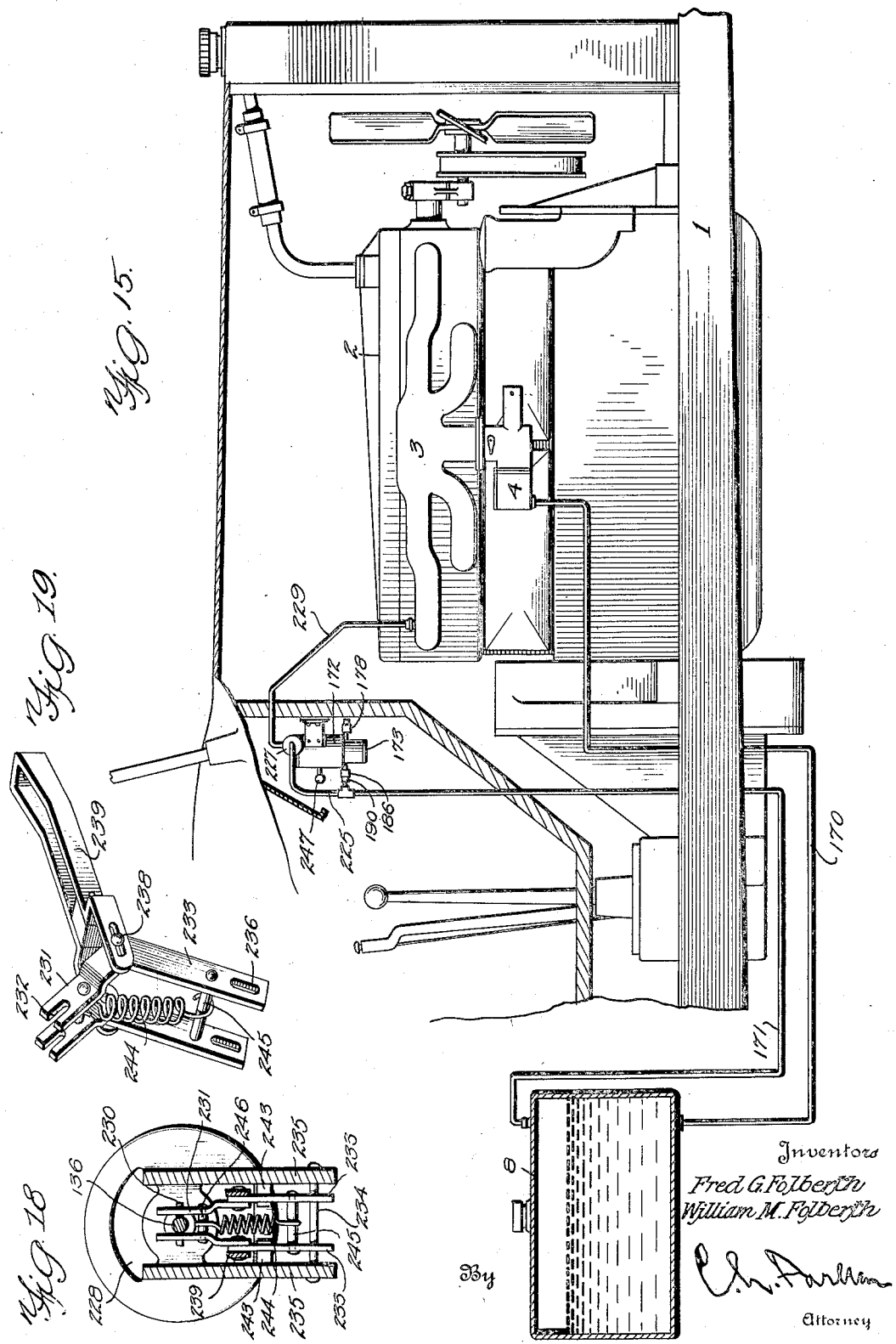

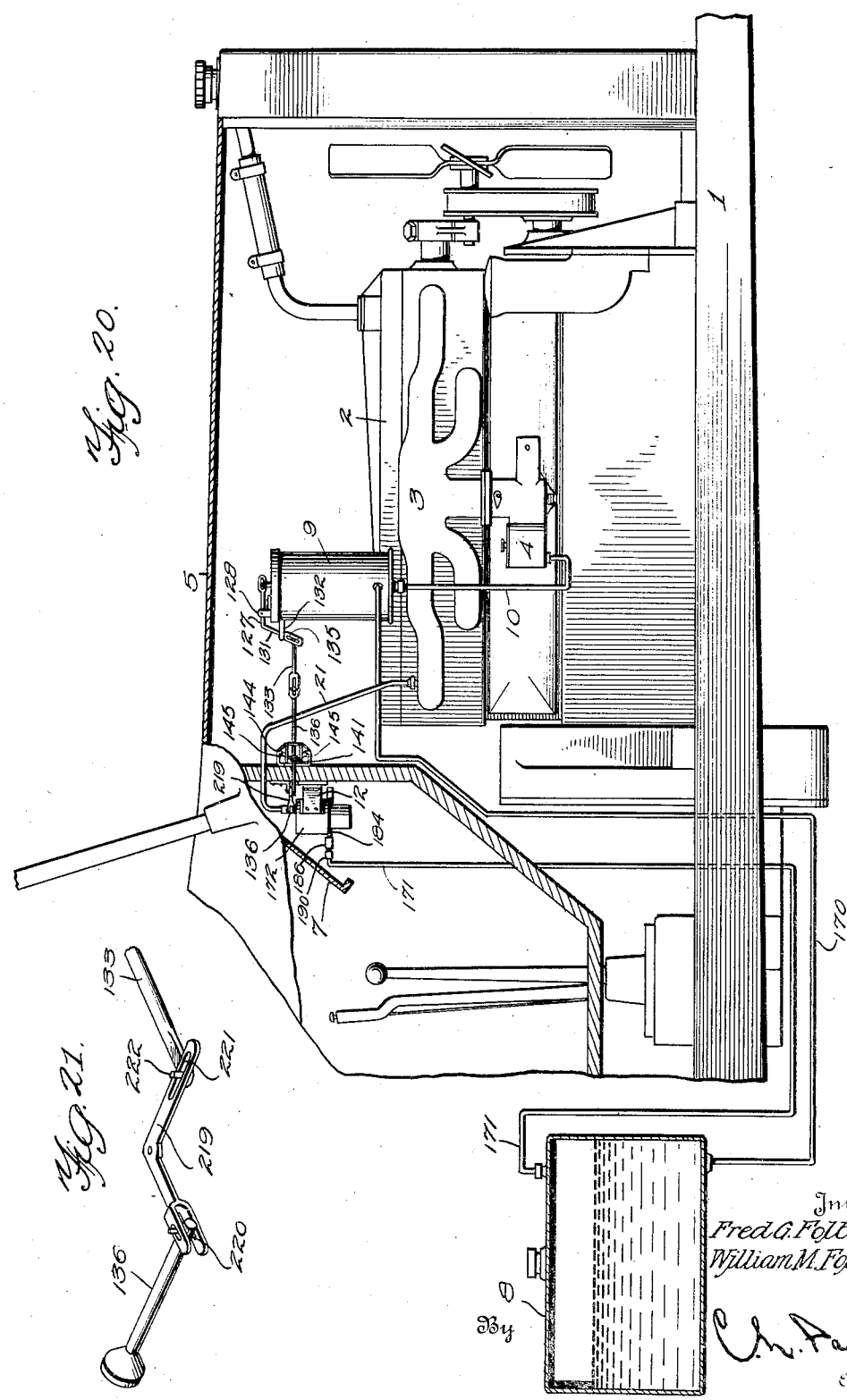

April 27, 1926. 1,582,212
F. G. FOLBERTH ET AL
FUEL FEEDING SYSTEM
Filed May 1, 1922 10 Sheets-Sheet 10

Inventor
Fred G. Folberth
William M. Folberth

Attorney

Patented Apr. 27, 1926.

1,582,212

UNITED STATES PATENT OFFICE.

FREDERICK G. FOLBERTH AND WILLIAM M. FOLBERTH, OF CLEVELAND, OHIO.

FUEL-FEEDING SYSTEM.

Application filed May 1, 1922. Serial No. 557,614.

*To all whom it may concern:*

Be it known that we, FREDERICK G. FOLBERTH and WILLIAM M. FOLBERTH, citizens of the United States, residing at Cleveland, in the county of Cuyahoga and State of Ohio, have invented certain new and useful Improvements in Fuel-Feeding Systems, of which the following is a specification.

This invention relates to fuel feeding systems, and more particularly to fuel feeding systems for motor vehicles.

An object of the present invention is the provision of a vacuum motor operated by the suction of the intake manifold to deliver fuel from a main reservoir to an auxiliary tank arranged adjacent the carburetor.

A further object is the provision of means for manually operating the motor if desired.

A further object is the provision of automatic control means for the motor whereby the delivery of fuel will be cut off when the level in the auxiliary tank reaches a predetermined point.

In the preferred form of the invention, a suction pump is arranged in the line between the main reservoir and the auxiliary tank and is connected to the vacuum motor to be operated thereby.

The motor is provided with suitable automatic valve control mechanism whereby it will operate continuously when connected to a source of power, and a control valve is arranged in the feed pipe adapted to start and stop the motor when desired. This control valve is automatic in operation, and is controlled by a float in the auxiliary tank, whereby it will be opened and closed as the fuel level in the tank lowers and raises.

In the present invention, we provide a closed auxiliary tank and a positive pump to deliver the fuel from the main reservoir, and eliminate the provision of a feed by the vacuum of the manifold, employing the vacuum instead to operate a motor which delivers the fuel to the tank.

Figure 22:
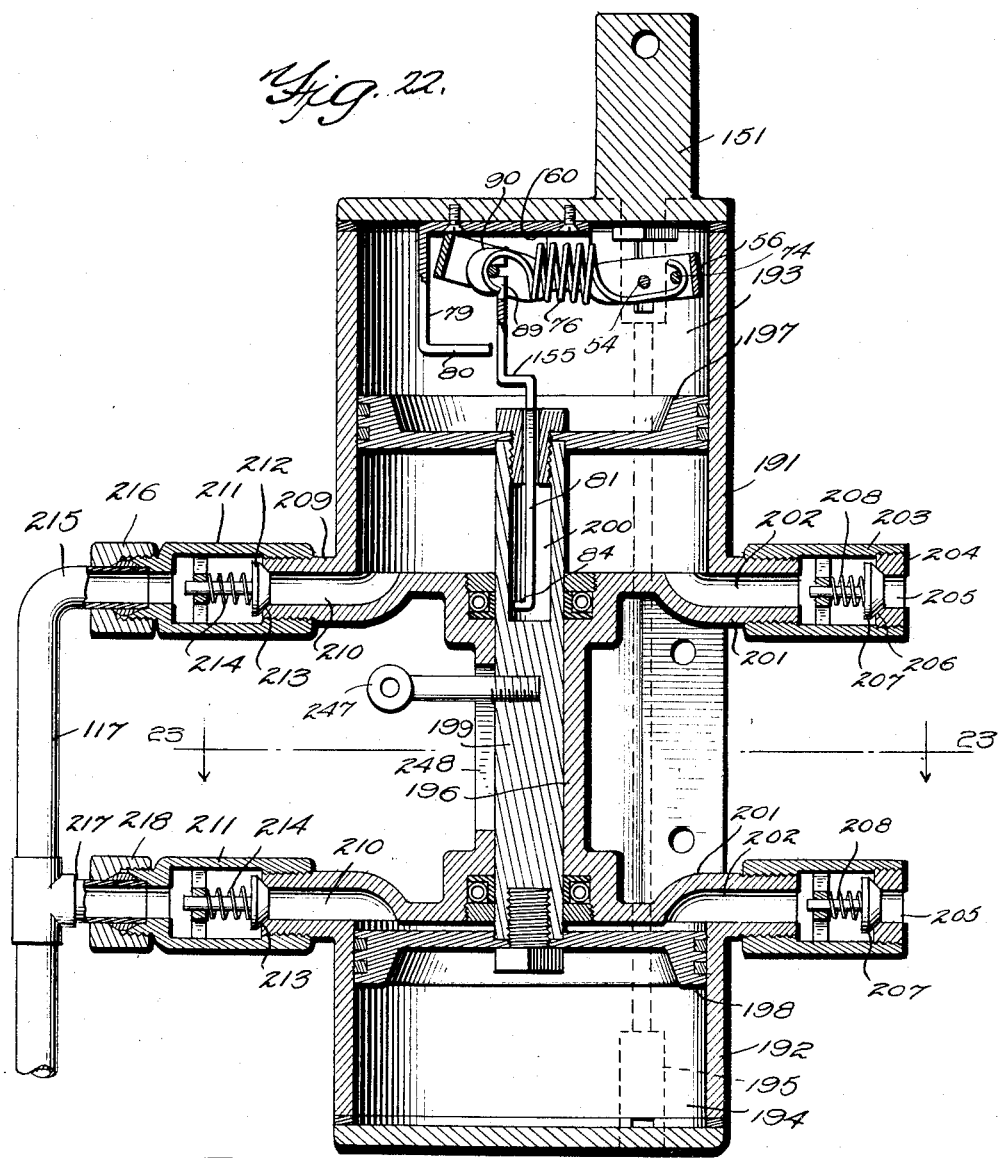
Figure 23:
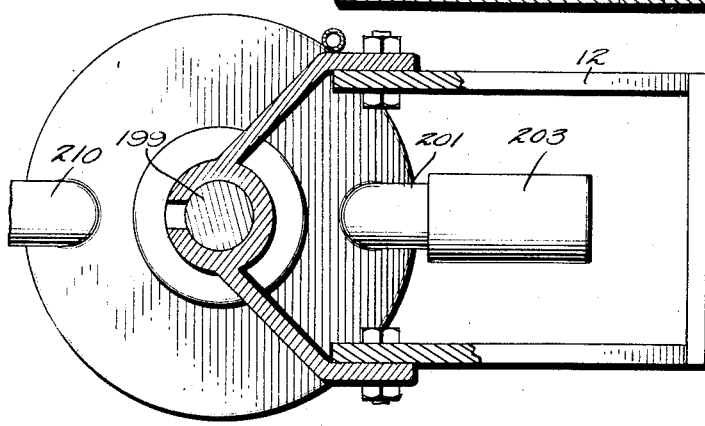

In the accompanying drawings, we have shown several embodiments of the invention. In this showing:

Figure 1 is a side elevation of a portion of a motor vehicle, showing the invention applied, parts being shown in section, Figure 2 is a vertical sectional view through the motor and pump, Figure 3 is a horizontal sectional view on line 3—3 of Figure 2, Figure 4 is a similar view on line 4—4 of Figure 2, Figure 5 is a horizontal sectional view on line 5—5 of Figure 2, Figure 6 is a view at right angles thereto, Figure 7 is a detail sectional view on line 7—7 of Figure 6, Figure 8 is a perspective view of a portion of the valve actuating mechanism of the motor, Figure 9 is a similar view of another portion of the valve actuating mechanism, Figure 10 is a sectional view of the auxiliary tank showing the float, Figure 11 is a detail view of a portion of the control valve mechanism, Figure 12 is a perspective view of a portion of the connection between the control valve and the float, Figure 13 is a vertical sectional view of a combined pump and motor, Figure 14 is a detail sectional view on line 14—14 of Figure 13, Figure 15 is a side elevation of a portion of a motor vehicle showing another form of the invention, parts being shown in section, Figure 16 is a vertical sectional view of a combined motor and air pump employed in connection with the form of apparatus shown in Figure 15, Figure 17 is a detail view of the motor cut off, Figure 18 is a detail sectional view on line 18—18 of Figure 17, Figure 19 is a detail view of the valve actuating mechanism, Figure 20 is a side elevation of a motor vehicle showing another form of the invention, Figure 21 is a detail view of the connection between the valve stem and the float control in the form shown in Figure 20, Figure 22 is a vertical sectional view of a combined motor and air pump employed in Figure 20 of the drawings, and, Figure 23 is a horizontal sectional view on line 23—23 of Figure 22.

Referring to the drawings, the reference numeral 1 designates the frame of a motor vehicle, provided with a suitable engine 2, having an intake manifold 3, and a carburetor 4. The engine is provided with a suitable hood 5 and a partition 6, separating it from the body of the vehicle. An instrument board 7 is arranged adjacent the partition 6.

A main fuel tank 8 is arranged at the rear of the vehicle in the usual manner and an auxiliary tank 9 is arranged beneath the hood and connected to the carburetor by a pipe 10. The tank 9 is arranged at a suitable elevation to feed fuel to the carburetor by gravity. The vacuum motor, forming a part of the present invention, consists of a casing 11 which is supported behind the instrument board on the partition by means of suitable brackets 12. This motor may be provided with a pair of spaced pistons 13, connected to each other by a member 14. The pistons may be provided with suitable cups or washers 15, held against the inner wall of the cylinder or casing by means of coil springs 16, arranged in circumferential grooves on the piston. The cups or washers extend over the face of the piston and are held in position by means of plates 17, secured to the face of the piston by bolts 18. The motor casing is provided with suitable heads 19, one of which is provided with an extension 20, having suitable ports therein to connect opposite ends of the cylinder or casing to a source of suction or pressure. As shown, the motor is connected to the intake manifold of the engine by means of a pipe or conduit 21. This conduit communicates with a tube 22 arranged in the extension 20 and the tube in turn communicates with a port or passage 23 in a packing nut 24. The packing nut is provided with a central bore 25, communicating with the port 23 and with a suction chamber 26, formed in the extension of the head.

The suction chamber communicates with a passage 27 opening into a chamber 28 arranged longitudinally of the cylinder. This chamber is provided with a threaded portion adapted to receive a plug 29. The plug is provided with a central bore 30 and is further provided with a circumferential groove 31 communicating with the passage 27. The groove communicates with the central bore by means of a passage 32. A valve member 33 is arranged within the plug. This valve member consists of a stem smaller in diameter than the diameter of the bore to permit passage of air through the bore of the plug. The opposite ends of the bore are provided with valve seats 34 and 35, adapted to receive valves 36 and 37, formed on the opposite ends of the valve member 33. The chamber 28 communicates with a transverse passage 38 which extends to the opposite side of the head and communicates with a longitudinal passage 39, extending through the head and casing to the opposite end of the casing. The end of the passage 39 communicates with a transverse passage 40, extending into the cylinder. The passage 38 is interrupted by a threaded plug 41, and this plug is provided with a groove 42 to permit passage of air or other fluid around it. The plug is provided with a central recess 43, communicating with the groove 42, by a port 44. This plug is arranged in a chamber 45, similar to the chamber 28 and extending into the cylinder. A plug 46, similar to the plug 29, is arranged in this chamber and this plug is provided with a central bore 47. A valve member 48 is arranged in the bore 47 and this member is provided with oppositely arranged valves 49 and 50 at its outer end. These valves are adapted to engage valve seats 51 and 52, formed on the adjacent ends of the plugs 41 and 46. The chamber 45 is provided with an opening 53, communicating with the atmosphere.

The valves 33 and 48 are adapted to be shifted by the reciprocation of the pistons and suitable valve operating mechanism is arranged adjacent the head and connected to the valve stems. As shown, the valve stems are connected to each other by means of a rod 54, and this rod passes through openings 55 in a yoke 56. As shown, the yoke comprises two intermediate substantially parallel portions, the outer ends of which diverge, as at 57, and are provided with substantially parallel terminals 58. These terminals are provided with notches 59, by means of which the yoke is pivotally supported on a supporting member 60. As shown, the supporting member is provided with openings 61 for the reception of screws 62 to secure it to the head. The supporting member is substantially T-shaped, provided with an upper arm 62. The ends of this arm are arranged at right angles to the body portion, as indicated at 63, and extend into the cylinder. These ends are provided with terminals 64, arranged substantially parallel to the head of the cylinder and in alinement with each other. These terminals are provided with suitable upper and lower notches 65 and 66. The notches 65 are spaced from each other a distance equal to the distance between the terminals 58 of the yoke 56 and are adapted to receive the notches of the yoke to pivotally support the yoke. A yoke 67 is arranged beneath the arm 62 of the supporting member, and this yoke comprises a pair of substantially parallel portions 68 which diverge toward their ends, as at 69, and are provided with substantially parallel ends 70. These ends are provided with notches 71, adapted to be received in the notches 66 of the arm 62. The yokes are provided with openings 72, and 73, adjacent their outer ends and these openings are adapted to receive pins 74 and 75. The yokes are connected by means of a tension spring 76, having hooked ends 77 and 78, which are arranged over the pins. The bottom of the supporting member is extended outwardly, as at 79, and is provided with an upstanding portion 80, forming a stop for the lower yoke. A member 81 is secured to the pin 75 and extends longitudinally of the cylinder. As shown, the adjacent piston 13 and the connecting member 14 are provided with a recess 82. The end of this recess is closed by a plug 83, and the connecting member extends through this plug. The opposite end of the connecting member is offset, as at 84, and is adapted to engage the inner end 85 of the plug when the pistons reach the end of a stroke, as indicated in Figure 2, to operate the valve mechanism. The member 81 is provided with an enlarged portion 86, adjacent its opposite end, forming shoulders 87. When the piston moves in the opposite direction and reaches the end of its stroke, as indicated in Figure 6, the outer face 88 of the plug engages the shoulder to throw the valves. The enlarged end 86 of this member is slotted, as at 89, and is adapted to straddle the end of the spring. This slotted portion is provided with a pair of hooks 90 which fit over the pin 75.

Means are provided for permitting manual operation of the motor if necessary at any time. The connecting member 14 is provided with a rack 91, meshing with a segmental gear 92, carried by a transverse shaft 93. The shaft 93 extends through a suitable bearing 94, on the instrument board, and is provided with an operating handle 95.

A fuel pump 96 is connected to the motor and is adapted to be operated by the reciprocation of the pistons within the motor. As shown, the motor casing is provided with a longitudinal slot 97 and the pump is provided with a similar slot 98. A bar 99 is connected to the member 14 and extends through the slots 97 and 98. This bar is connected to a piston rod 100, arranged in the pump cylinder. The piston rod is provided with a pair of pistons 101, secured to its opposite ends. Each end of the cylinder is provided with an inlet opening 102, and an outlet opening 103. As shown, a pipe 104 extends from the main fuel tank and is provided with branches 105, communicating with the inlet openings. The inlet openings of the pump are provided with substantially cylindrical casings 106, adapted to receive valve members 107. An inwardly opening valve 108 is arranged within the valve member and is adapted to open inwardly by suction, being normally held in closed position by a spring 109. The valve member is connected to the branch pipe 105, by a suitable packing nut 110.

The outlet openings 103 are likewise surrounded by cylindrical members 111. These members are adapted to receive valve supporting members 112 and an outwardly opening valve 113 is carried by the valve member. The valve is normally held in closed position by means of a spring 114. The valve members are connected to branch pipes 115 by suitable packing nuts 116, and these branch pipes communicate with a main pipe 117, extending from the pump to the auxiliary chamber 9. The pump cylinder is secured to the partition 6 by means of suitable brackets 118.

As stated, means are provided for controlling the operation of the motor and pump by the level of liquid in the auxiliary tank 9. As shown, a rod 119 extends through the tank, being supported in a bearing 120, carried by the top of the tank and a bearing 121 carried by a spider 122, secured to the bottom of the tank. This rod is provided with pins 123 and 124. A float 125 is arranged on the rod, the float being provided with a bearing portion 126. As the float moves upwardly and downwardly, the bearing portion 126 is adapted to engage the pins 123 and 124, to cause the rod to move vertically. A lever 127 is pivotally mounted in a pair of ears 128, formed on the top of the tank and this lever is provided with a slot 129, adjacent its end adapted to receive a pin 130, carried by the rod 119. The other end of this lever extends downwardly, as at 131, and operates between a pair of guide members 132. This lever is connected to a link 133, as indicated at 134. The opposite end of the link 133 is provided with an elongated slot 135. A valve stem 136 extends through the packing nut 24, and this stem carries a valve 137, adapted to engage a valve seat 138, formed on the inner end of the plug. The outer end of the valve stem is offset, as at 139, and is adapted to be received in the slotted end of link 133. The offset end of the lever may be retained in the slot by any suitable means, as by the cotter pin 140. It will be apparent that the movement of the rod 119 moves the link 133 to open and close the valve 137. Means are provided for positively moving the valve to open and closed position. As shown, the valve stem 136 is provided with an enlargement 141 and this enlargement is provided with an annular groove 142. A pair of cylindrical members 143 are mounted on opposite sides of the valve stem, the cylindrical members being pivotally supported in suitable brackets 144. A spring 145 is arranged within each of the cylindrical members and these springs engage plungers 146 tending to hold the plungers at the outer ends of the cylinders. The plungers are provided with pins 147, extending through the cylinder leads and entering the groove 142.

In the form of the invention shown in Figures 13 and 14 of the drawings, the motor and pump are arranged in a single casing. As shown, the motor casing 148 is provided with an extension 149, which forms the pump cylinder. The opposite end of the motor is closed by a head 150, having an extension 151. This extension is provided with ports and valves similar to the ports and valves arranged in the extension 20, previously described and a further description of these parts is deemed unnecessary. A piston 151' is arranged in the cylinder, and this piston is provided with a cylindrical extension 152. A piston 153 is arranged on the opposite end of this extension and operates in the cylinder 149. The length of the extension 152 is sufficient to properly space the two pistons in the two cylinders and must be great enough that the upward movement of the piston 151' does not move the piston 152 beyond the top of the cylinder 149. The valve operating mechanism employed in this form of the invention is substantially similar to that employed in the form heretofore described and similar reference numerals are employed to designate like parts. The extension 152 is provided with a recess 154, which is adapted to receive the operating member 81 and the plug 83 is arranged in this member. Due to the difference in the position of the recesses 82 and 154, it is necessary to provide an offset portion 155 in the member 81.

The pump cylinder 149 is connected to the pipe 104. As shown, the cylinder is provided with an inlet opening 156, formed in the tubular extension 157. This tubular extension is threaded for the reception of a valve casing 158, which is provided with a valve seat 159. An inwardly opening valve 160 is supported in the casing and is adapted to engage the valve seat. The valve stem is surrounded by a spring 161, which tends to retain the valve in closed position. A suitable packing nut 162 is arranged on the end of the pipe 104 and is adapted to secure it to the casing 158. The opposite side of the cylinder is provided with an outlet opening 163, formed in a tubular extension 164. This extension is provided with a valve seat 165, at its outer end, adapted to be engaged by a valve 166. The valve is supported in a suitable valve casing 167, and is normally retained in closed position by a spring 168. The valve casing is connected to pipe 117 by a suitable packing nut 169.

In Figures 15 to 23 of the drawings, we have shown several forms of apparatus in which the motor operates a pressure pump adapted to deliver air to the top of the fuel tank 8 and force the fuel from the fuel tank to the auxiliary tank 9 or direct to the carburetor. In the form shown in Figures 15 to 19, the main fuel tank is connected to the carburetor by a pipe 170, and the main tank is connected to the pump by a pipe 171. The motor and pump are formed in a casing consisting of two cylindrical sections 172 and 173, similar to the motor and pump casing shown in Figures 13 and 14 of the drawings. In this form of the invention, the upper end of the cylinder 172 serves as one end of the motor casing and the cylinder 173 serves as the opposite end of the motor casing, the cylinder 173 being connected to the extension 151 of the head by means of a pipe 174. The operation of the motor is substantially the same as in the forms heretofore described and a further description thereof is deemed unnecessary. The lower end of the cylinder 172 around the extension 152 forms an air pump 175. This pump is provided with a tubular extension 176, having an inlet opening 177 arranged therein. A valve casing 178 is secured to the tubular extension and the outer end of this valve casing is adapted to receive a plug 179. The plug is provided with an inlet opening 180 and is further provided with a valve seat 181 on its inner end. A valve 182 is mounted in the valve casing and is adapted to engage this seat, the valve stem being surrounded by a spring 183 to normally retain it in closed position. The opposite side of the pump chamber is provided with a tubular extension 184, having an outlet opening 185. A valve casing 186 is secured to the tubular extension and a valve 187 is arranged in this casing. This valve is adapted to engage a valve seat 188 formed on the outer end of the tubular extension and is retained in engagement with the seat by a spring 189, surrounding the valve stem. The valve casing is connected to pipe 171 by a suitable packing nut 190.

The pump 175 creates a pressure in the pipe 171, forcing the liquid from the fuel tank 8 to the carburetor through pipe 170. Means are provided to automatically control the pressure in this pipe between certain limits. As shown, a branch pipe 225 extends upwardly from the pipe 171, and this branch pipe communicates with a cylinder 226, closed by a head 227. The opposite end of the cylinder is open to the atmosphere through an opening 228. The air motor is provided with cutoff valve 137 heretofore described, mounted on a valve stem 136 adapted to control communication between the manifold and the head 151 through pipe 229. Valve stem 136 is provided with a pair of pins 230 and a yoke consisting of arms 231 is adapted to engage these pins, the ends of the arms being provided with slots 232 for the reception of the pins. The opposite ends of the arms are secured to a second yoke formed of arms 233, which are pivotally mounted on a pin 234, carried by plates 235. As shown, the pin 234 extends through elongated slots 236 in these arms. The corresponding arms are secured to each other by pins 237, passing through a slot 238 in an arm 239. This arm passes through the bottom of the cylinder and the end is secured to a piston 240 in the cylinder 226.

The piston is normally held in its outer position by a spring 241. Stops 242 and 243 are provided on the plates 235 to limit the movement of the yokes.

In the form of the invention shown in Figure 20 of the drawings, the construction is essentially the same, except that the pipe 170 is connected to the auxiliary tank 9 and the auxiliary tank in turn connected to the carburetor by a pipe 10. In this form of the invention, the control apparatus described in connection with Figures 1 to 14 consisting of the float and its connecting parts, is employed.

In Figures 22 and 23 of the drawings, we have shown a slightly modified construction, wherein a double acting pump is employed. In this form of the invention, there is provided a pair of cylinders 191 and 192, and the remote ends 193 and 194 of these cylinders form the motor chambers. The outer head of the cylinder 191 is provided with an extension 151, and the motor chamber 194 of the cylinder 192 is connected to the suction chamber of this head by a pipe 195. The two cylinders are connected to each other by a cylindrical portion 196. Pistons 197 and 198 are arranged in the cylinders 191 and 192 respectively. These pistons are connected by a connecting member 199, extending through the cylindrical member 196, and this connecting member is provided with a recess 200, for the reception of the valve actuating member 81. The outer ends of the cylinders serve as motor chambers, as stated, and the inner ends of the cylinders serve as pump chambers. As shown, the inner end of each cylinder is provided with a tubular extension 201, having an inlet opening 202 formed therein. A valve casing 203 is secured to the tubular member and the outer end of this casing is closed by a plug 204, having a central opening 205 and a valve seat 206 is formed at the inner end of this plug and a valve 207 is arranged within the casing and engages this seat. The valve is retained in engagement with the seat by a spring 208.

The pump chambers are further provided with tubular extensions 209 arranged opposite the extensions 201 and provided with outlet openings 210. Valve chambers 211 are secured to these extensions and a valve 212 is arranged in each of the valve chambers adapted to engage a valve seat 213, on the outer end of the tubular extension. The valve is normally retained in engagement with the seat by a spring 214. The pipe 171 extends to one of the valve casings 211 and is provided with an offset end 215, connected to the valve casing by a packing nut 216. The other valve casing is connected to a branch pipe 217 by means of a packing nut 218, which branch pipe communicates with the pipe 171.

Referring to Figure 21 of the drawings, when a motor is employed of the type shown in Figures 13 and 14, and Figures 17 to 20, the valve stem 136 and the link 133 are arranged at right angles to each other, and it is necessary to employ a different connection from that shown in Figure 12 of the drawings. In these types of motor, a bell crank lever 219 is employed, one end of which is secured to the valve stem, as at 220, and the other end of which is provided with a slot 221, for the reception of a pin 222, carried by the link 133.

In the operation of the form of the invention shown in Figures 1 to 10 of the drawings, the motor 11 operates the pump 96, drawing the fuel from the main reservoir 8 through the pipe 104, through the pump, and thence to the auxiliary tank 9 through the pipe 117. The tank 9 is arranged above the carburetor and is adapted to feed fuel to the carburetor by gravity. This tank is of small size, whereby it may be installed in the limited amount of space available beneath the hood of a motor vehicle, but is large enough to hold sufficient fuel to supply the needs of the carburetor at all times. The motor 11 is connected to the intake manifold 3 by means of pipe 21, and is automatic in operation. With the parts in the position shown in Figures 2 and 5 of the drawings, the left end of the motor cylinder is in communication with the source of suction and the piston is about to start a stroke, moving toward this end of the cylinder. The valve 37 is disengaged from the valve seat, permitting communication of this end of the cylinder with the conduit 21 by means of passages 23 and 25, suction chamber 26, passages 27 and 31, and the bore 30 of the plug 29. This end of the cylinder is cut off from communication with the atmosphere by the engagement of valve 50 and valve seat 52. The opposite end of the cylinder is cut off from communication with the suction chamber 26 and the source of suction by the engagement of valve 36 with its seat 34. This end of the cylinder is in communication with the atmosphere through passages 39 and 40, transverse chamber 38, port 44, recess 43 of plug 41, and opening 53. As the piston reaches the end of its stroke, the face 88 of the plug 83 engages the shoulder 87 of the operating member 81 and swings the yoke 67 on its pivot to the position shown in Figure 6 of the drawings. As the yoke is swung on its pivot, the lower end of spring 76 moves toward the head of the cylinder, and when the spring assumes a position beyond the pivot of the yoke 56, the yoke is snapped over from the position shown in Figure 2 of the drawings, to the position shown in Figure 6 of the drawings, moving the valves outwardly. This causes the valve 37 to engage its seat, the valve 36 to open, the valve 50 to open, and the valve 49 to engage its seat. The left end of the cylinder is then cut off from communication with the suction chamber 26 by the engagement of valve 37 with its seat 35 and is in communication with the atmosphere, through the bore 47 of plug 56, chamber 51, and opening 53. The other end of the cylinder is cut off from communication with the atmosphere through the engagement of the valve 49 with its seat and is in communication with the source of suction through the bore of plug 29, chamber 28, transverse chamber 38, and passages 39 and 40. The pistons will then move to the right and as they approach the position shown in Figure 2 of the drawings, the offset end 84 of the operating member 81 engages the inner end 85 of the plug 83 to move the lower yoke 67 outwardly. This moves the lower end of the spring and when the spring passes the pivot point of the upper yoke, the yoke will immediately snap over to the position shown in Figure 2 of the drawings, reversing the valves.

The pump 96 is actuated by the motor, the pistons 101 being reciprocated by bar 99. In the position shown in Figure 2 of the drawings, the left end of the cylinder has drawn a charge of fuel from the pipe 104, and on the next stroke of the piston, this fuel is forced through the outlet opening 103 into the pipe 117, whence it is conveyed to the auxiliary tank 9. The valve 113 is opened by the pressure of the fuel and is immediately closed by the spring 114. During this stroke, the opposite end of the pump cylinder draws in a charge of fuel through inlet opening 102, the valve 108 being removed from its seat by the suction created by the movement of the piston. As long as the motor is in operation, the fuel is drawn from the pipe 105 and delivered to the pipe 117.

The motor and pump are preferably designed to deliver a greater amount of fuel to the tank 9, than is necessary to supply the needs of the engine, and to prevent the tank 9 from over-flowing, it is desirable to provide means to automatically cut off the motor when desired. The float 125 is raised in the tank 9 as the level of fuel raises, until the sleeve 126 strikes the pin 123, which raises the rod 119 and swings the lever 127 on its pivot. This draws the link 133 to the right and when the link moves a sufficient distance to permit the offset end 139 of valve stem 136 to reach the end of slot 135, the valve stem is moved to the right to bring the valve 137 into engagement with valve seat 138 to cut off the motor. As the valve stem moves outwardly, the pivoted cylinders 143 are swung on their pivots, and tend to assume a position at right angles to the valve stem. The pins are thus forced inwardly, placing the springs 145 under compression, and when the cylinders pass a position at right angles to the valve stem, the tension of the springs immediately snaps the valve stem to its extreme outer position, instantly closing the valve 137. The elongated slot 135 is provided to permit this movement of the valve stem independent of the link 133. As the level of fuel lowers, the sleeve 126 engages the pin 124, moving the lever 127 and link 133 in the opposite direction to move the valve stem 136 inwardly to open the valve. This re-establishes communication with the manifold and the motor begins to operate, operating the pump and delivering fuel from the tank 8 to the tank 9.

If the tank 9 should become emptied while the motor is not running, due to leakage in the pipes, a leak in the carburetor, or other exhaustion of the supply of fuel within the system, it may be refilled from the tank 8 by manually operating the motor. The shaft 93 may be oscillated by hand, by means of the handle 95 oscillating the gear 92, which meshes with the rack 91 formed on the member 14. The pistons will thus be reciprocated. In employing the ordinary vacuum fuel system, if the supply of fuel in the system is exhausted and the vacuum tank emptied, it is necessary to refill this tank independently of the filling of the main reservoir before the system will function or refill it by driving the engine from the starter motor, whereas in the present invention, the supply is merely replenished in the main tank and the auxiliary tank refilled by manual operation of the motor, which may be accomplished from the driver's seat.

In the form of the invention shown in Figures 13 and 14 of the drawings, the cylinder 148 serves as the motor cylinder and opposite sides of the piston 151' are alternately placed in communication with the source of suction in the manner hereinbefore described. The piston 153 being connected to the piston 151' through the medium of the extension 152, reciprocates in the cylinder 149 when the motor piston is reciprocated and on its up-stroke, draws in fuel from the tank through the valve casing 158, the valve 160 being drawn from its seat by suction, and the valve 166 being retained on its seat by suction. On the down-stroke of the piston, the valve 160 is closed by the pressure generated in the cylinder and the valve 166 opened, permitting the fuel to flow into the pipe 117 and thence to the tank 9. The motor in this form of the invention is controlled by the automatic control valve 137, which is opened and closed by the level of liquid in the tank 9, in the manner heretofore described. As the valve stem 136 is arranged at right angles to the link 133 in this form of the invention, the bell crank lever 219 is employed to connect these parts and the movement of the link, due to the rise and fall of liquid in the tank 9 is transmitted to the valve stem through this lever.

In the form of the invention shown in Figures 15 to 18, the fuel is forced directly from the reservoir 8 through pipe 170 to the carburetor, by means of pressure transmitted to the top of the tank through the pipe 171. The liquid pump employed in the forms of the invention heretofore described is replaced by a gas pump which is driven by the vacuum motor to pump air into the upper portion of the fuel tank which forces the fuel out of the lower end of the tank into the pipe 170.

The motor in this form of the apparatus is controlled by the pressure in the system. The strength of spring 241 is computed to hold the piston in the position shown in Figure 17 against the pressure in the system and allow the pump to operate until a predetermined pressure is reached. When a pressure is reached sufficient to overcome the tension of spring 241, the piston is moved inwardly. When the pin 237 reaches the end of slot 238, the yokes are swung on their pivots, the inner yoke pivoting on the pins 230. The yokes are connected by a spring 244 secured to pins 245 and 246, carried by the yokes, and when the connected ends of the yokes pass a line drawn between the two ends of the spring, the yokes are snapped over until they engage the stop 242. This moves the valve stem 136 outwardly and closes the valve 137, insuring a positive cut off of the valve, and the pressure of the spring 244 retains the valve in closed position. When the air pressure in the system lowers, the reverse operation takes place, the spring 241 overcoming the pressure to force the piston 240 outwardly and swing the yokes in the opposite direction until they engage the stop 243, thus opening the valve. By this means, the motor is cut on when the pressure falls below a predetermined point and the capacity of the motor may be calculated in excess of the normal requirements of the engine to insure a supply of fuel at all times.

In the form of apparatus shown in Figures 20 to 23, the operation is essentially the same, the fuel, however, being delivered to the auxiliary tank by the pressure in pipe 171 and the top of the tank. When the auxiliary tank is filled with fuel or normally filled, the float is raised, closing the valve 137 through the medium of link 133, and bell crank lever 219. In the forms shown in Figures 15 to 23 of the drawings, a handle 247 may be arranged on the piston or the connecting member 199 passing through a slot 248 in the cylinder wall, to permit manual operation if the apparatus should fail to function in its proper manner.

In the form of motor and pump shown in these figures, the upper end of the cylinder 172 and the lower end of the cylinder 173 form the two portions of the vacuum motor, and are alternately connected to the suction chamber in the head 197 by the automatic valve mechanism described. Beneath the piston 151', there is provided a chamber 175 which forms the air pump. The upward movement of the pistons creates a partial vacuum in this chamber, opening the valve 182 and holding the valve 187 in closed position. Air is delivered to the chamber 175 during this stroke through opening 180 in the plug 179. At the end of the upstroke, the valve 182 is closed and is retained in closed position on the down-stroke by pressure. On the downward stroke, the air is compressed sufficiently to overcome the spring 189, opening the valve 187 and the air is delivered to the top of the reservoir through pipe 171. The air in the top of the reservoir displaces a portion of the fuel which is driven through the pipe 170 to the auxiliary tank 9. The control mechanism heretofore described, by means of which the vacuum motor is cut off, is employed in connection with this form of the invention.

The operation of the form shown in Figures 22 and 23 is essentially the same. The remote ends of the two cylinders form the motor and are connected to the suction chamber in the head 151, the lower cylinder 192 being connected through pipe 195. The pistons 197 and 198 are reciprocated in the manner heretofore described. On the upward movement of the pistons, air is drawn into the lower portion of the upper cylinder through valve 207, the suction created by the upward movement of the piston, overcoming the spring 208 and opening the valve. During this stroke, the valve 212 is retained on its seat by the suction in the cylinder. At the same time, air in the upper portion of the lower cylinder is delivered to the pipe 171 through the outlet opening 210, the pressure being sufficient to offset spring 214, and open the valve. During this stroke, the valve 207 of the lower chamber is retained in closed position by the pressure and by spring 208.

On the downward stroke, the operation is reversed, and the air in the upper cylinder is forced into the pipe 171. During this stroke, the lower chamber draws in a quantity of air through the valve 207. The construction shown in these figures provides a double acting air pump which functions in the same general manner as the single acting pump shown in Figures 17 and 18.

The provision of an automatic vacuum motor operated by the suction of the intake manifold provides means for delivering fuel which may be readily installed upon a vehicle and operated at practically no expense. By providing means for manually operating the vacuum motor, the auxiliary tank may be filled at any time from the main reservoir, and it is not necessary to independently fill this tank. The system is a closed system not communicating with the atmosphere, which is advantageous and provides a more positively acting apparatus.

It is to be understood that the forms of our invention herewith shown and described are to be taken as preferred examples of the same, and that various changes in the shape, size, and arrangement of parts may be resorted to without departing from the spirit of the invention or the scope of the subjoined claim.

We claim:

A fuel feeding system for motor vehicles, comprising a main tank, an auxiliary tank, a suction motor connected to the intake manifold of the engine to be operated thereby, means actuated by said motor to deliver fuel to the auxiliary tank, a reciprocating cut off valve arranged in said motor, said valve being provided with a valve stem, a float in said auxiliary tank, connections between said valve and said float to open and close said valve as the float lowers and rises, and springs engaging said valve stem to positively move said valve to open and closed position.

In testimony whereof we affix our signatures.

FREDERICK G. FOLBERTH.
WILLIAM M. FOLBERTH.